(12) United States Patent
Koch

(10) Patent No.: US 9,064,064 B2
(45) Date of Patent: Jun. 23, 2015

(54) EXPECTED BATTERY LIFE DETERMINATION SYSTEMS AND METHODS

(75) Inventor: Robert Koch, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 544 days.

(21) Appl. No.: 13/467,526

(22) Filed: May 9, 2012

(65) Prior Publication Data

US 2013/0278270 A1 Oct. 24, 2013

Related U.S. Application Data

(60) Provisional application No. 61/636,074, filed on Apr. 20, 2012.

(51) Int. Cl.
| | |
|---|---|
| *G01N 27/416* | (2006.01) |
| *G06F 17/50* | (2006.01) |
| *G01R 31/36* | (2006.01) |

(52) U.S. Cl.
CPC ........ *G06F 17/5009* (2013.01); *G01R 31/3679* (2013.01); *G06F 2217/76* (2013.01); *G06F 2217/78* (2013.01)

(58) Field of Classification Search
CPC ..................... G01R 31/3658; G01R 19/16542; G01R 31/3648; H02J 7/0021; Y02E 60/12
USPC ........................................................ 324/426
See application file for complete search history.

(56) References Cited

U.S. PATENT DOCUMENTS

| | | | | |
|---|---|---|---|---|
| 2001/0052759 A1* | 12/2001 | Sakurai et al. | ................ | 320/134 |
| 2003/0086229 A1* | 5/2003 | Poe et al. | ...................... | 361/93.1 |
| 2007/0096697 A1* | 5/2007 | Maireanu | ...................... | 320/149 |
| 2008/0164881 A1* | 7/2008 | Miyamoto | .................... | 324/429 |

FOREIGN PATENT DOCUMENTS

WO 2011/075080 A1 6/2011

OTHER PUBLICATIONS

International Search Report and Written Opinion in corresponding International Application (i.e., PCT/US2013/037060), mailed Aug. 2, 2013 (13 pages).

(Continued)

*Primary Examiner* — Arun Williams
(74) *Attorney, Agent, or Firm* — Maginot Moore & Beck LLP

(57) ABSTRACT

A method includes: generating a first age factor value for a battery based on: a cycle period of the battery; a required operational life of the battery; and a cycle life of the battery. The method further includes generating a second age factor value for the battery based on: the required operational life; and a resting life of the battery. The method further includes generating a third age factor value for the battery based on: the required operational life; the first age factor value; the second age factor value; and at least one of an expected period of cycling of the battery during the required operational life and expected period of resting of the battery during the required operational life. The method further includes: generating an expected life of the battery based on the required operational life and the third age factor value; and displaying the expected life.

20 Claims, 6 Drawing Sheets

(56) References Cited

OTHER PUBLICATIONS

Institute of Electrical and Electronics Engineers (IEEE), "IEEE Recommended Practice for Sizing Nickel-Cadmium Batteries for Stationary Applications," IEEE Std 1115-2000 (R2011) (Revision of IEEE Std 1115-1992), IEEE Standard, New York, NY, USA, Sep. 11, 2000, E-ISBN: 0-7381-1951-2 (26 pages).

Institute of Electrical and Electronics Engineers (IEEE), "IEEE Recommended Practice for Sizing Lead-Acid Batteries for Stationary Applications," IEEE Std 485-2010 (Revision of IEEE Std 485-1997), IEEE Standard, New York, NY, USA, Apr. 15, 2011, E-ISBN: 978-0-7381-6508-3 (70 pages).

* cited by examiner

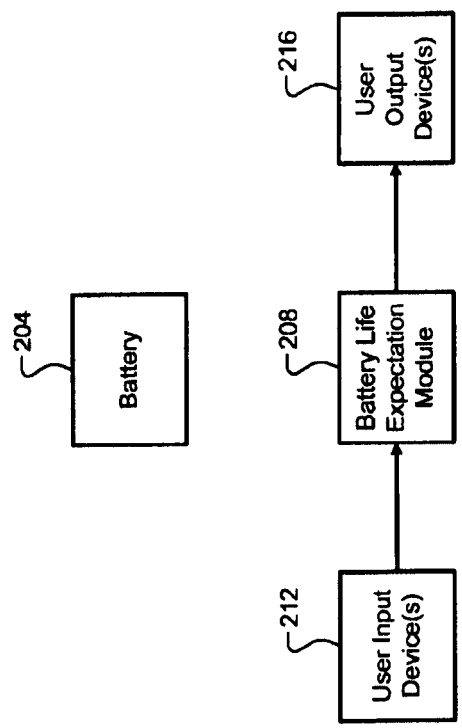
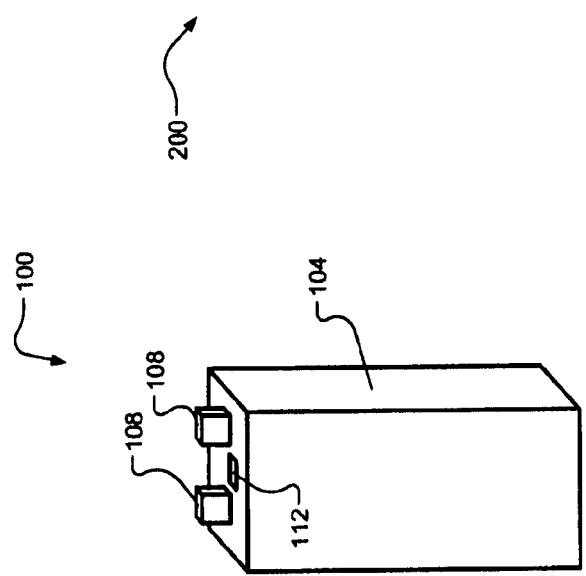

EXPECTED BATTERY LIFE DETERMINATION SYSTEMS AND METHODS

CROSS-REFERENCE TO RELATED APPLICATIONS

This application claims the benefit of U.S. Provisional Application No. 61/636,074, filed on Apr. 20, 2012. The disclosure of the above application is incorporated herein by reference in its entirety.

STATEMENT OF GOVERNMENT RIGHTS

Portions or all of this invention may have been produced pursuant to U.S. Government Contract No. DE-FC26-05NT42403. The U.S. Government may therefore have certain rights in this invention.

FIELD

The present disclosure relates to batteries and more particularly to systems and methods for determining an expected life of a battery.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Numerous devices use one or more re-chargeable batteries that supply electric power for operation. For example, hybrid electric vehicles (HEVs) and plug-in HEVs may include one or more re-chargeable batteries. HEVs and plug-in HEVs use multiple propulsion systems to provide motive power. The propulsion systems may include electric or battery powered systems that receive power from one or more battery modules. A battery module may include, for example, one or more banks of high-voltage cells (or batteries), such as lithium ion cells. The cells are volumetric building blocks of the battery module.

SUMMARY

A system for determining an expected life of a battery includes a first age factor module, a second age factor module, a third age factor module, and an expected life module. The first age factor module generates a first age factor value for the battery based on: a cycle period of the battery generated based on user input; a required operational life of the battery generated based on user input, the required operational life corresponding to a continuous period including both cycling and resting of the battery during which the battery is required to satisfy one or more predetermined performance criteria; and a cycle life of the battery generated based on user input, the cycle life corresponding to a period of continuous cycling of the battery after which the battery is expected to begin to fail to satisfy at least one of the predetermined performance criteria. The second age factor module generates a second age factor value for the battery based on: the required operational life of the battery; and a resting life of the battery generated based on user input, the resting life of the battery corresponding to a period of continuous resting of the battery after which the battery is expected to begin to fail to satisfy at least one of the predetermined performance criteria. The third age factor module generates a third age factor value for the battery based on: the required operational life of the battery; the first age factor value; the second age factor value; and at least one of an expected period of cycling of the battery during the required operational life and expected period of resting of the battery during the required operational life. The expected life module generates an expected life of the battery based on the required operational life of the battery and the third age factor value and displays the expected life of the battery on a display.

A method for determining an expected life of a battery includes: generating a first age factor value for the battery based on: a cycle period of the battery generated based on user input; a required operational life of the battery generated based on user input, the required operational life corresponding to a continuous period including both cycling and resting of the battery during which the battery is required to satisfy one or more predetermined performance criteria; and a cycle life of the battery generated based on user input, the cycle life corresponding to a period of continuous cycling of the battery after which the battery is expected to begin to fail to satisfy at least one of the predetermined performance criteria. The method further includes generating a second age factor value for the battery based on: the required operational life of the battery; and a resting life of the battery generated based on user input, the resting life of the battery corresponding to a period of continuous resting of the battery after which the battery is expected to begin to fail to satisfy at least one of the predetermined performance criteria. The method further includes generating a third age factor value for the battery based on: the required operational life of the battery; the first age factor value; the second age factor value; and at least one of an expected period of cycling of the battery during the required operational life and expected period of resting of the battery during the required operational life. The method further includes: generating an expected life of the battery based on the required operational life of the battery and the third age factor value; and displaying the expected life of the battery on a display.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a perspective view of a prismatic cell;

FIG. 2 is a functional block diagram of an example system for determining an expected life of a battery according to the present disclosure;

DETAILED DESCRIPTION

Figure 3A:
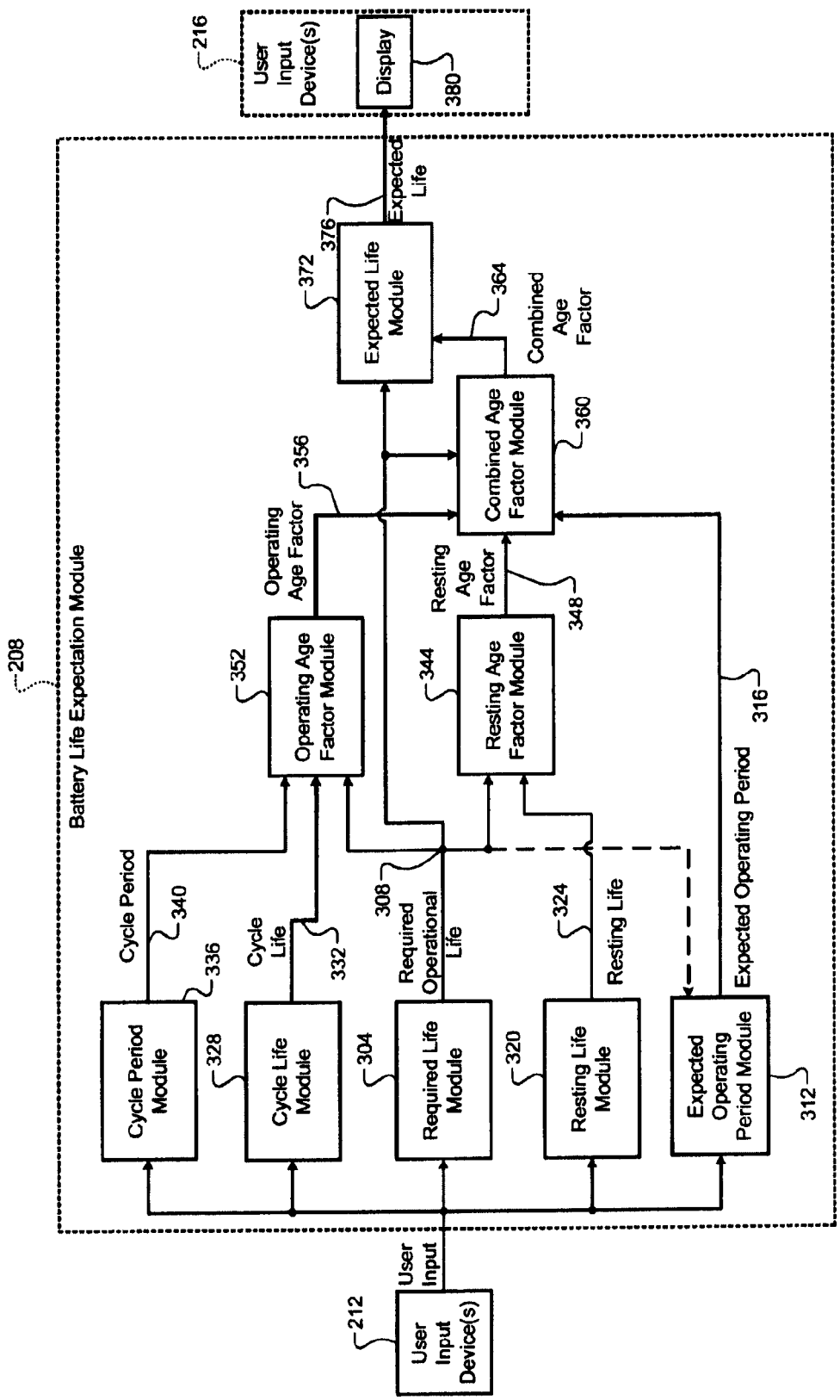
FIGS. 3A-3D are example functional block diagrams of the system for determining an expected life of a battery according to the present disclosure.

A product manufacturer may provide one or more required parameters for a battery that is to be used in conjunction with a given application or product. An example requirement may be that the battery have at least a predetermined operational life assuming that the battery will be cycled (charged and discharged) for a first period during the operational life and that the battery will be at rest for the remainder of the operational life.

The present application describes systems and methods for determining an expected life of a battery based on parameters input by a user and indicating the expected life of the battery to the user. The expected life of the battery can be used, for example, to determine whether the battery is suitable for the application or product, whether the battery should be redesigned, or whether another battery having different characteristics should be chosen for the application or product.

In FIG. 1, a perspective view of a prismatic cell (hereafter "cell") 100 is shown. The cell 100 may include, for example, a rectangular shaped, lithium-ion cell with a housing (or can) 104. As an example, the housing 104 may be formed of aluminum or another suitable material. The cell 100 and one or more other cells can be electrically connected in series, in parallel, or combinations thereof.

The cell 100 further includes a pair of terminals 108 that extend from the cell 100. The terminals 108 may include, for example, cylindrical terminals, threaded terminals, flat terminals, or another suitable type of terminal. The cell 100 may be charged and electrical energy may be drawn from the cell 100 via the terminals 108. The cell 100 may include a release vent 112. The release vent 112 opens and releases gas from within the cell 100, for example, when the cell 100 is overcharged. The release vent 112 may include: a membrane that ruptures; a valve that opens; a plug that separates from the cell 100; and/or one or more other suitable venting elements. The cell 100 may also include other features. While the cell 100 is shown and described, the present application is equally applicable to other types of cells.

Referring now to FIG. 2, a functional block diagram of an example system 200 for determining an expected life of a battery 204 and indicating the expected life to a user is presented. The term "battery" may refer to a single cell, a group of cells that are electrically connected, multiple groups of cells that are electrically connected, etc. Thus, the battery 204 may include a single cell, such as the cell 100, a group of multiple cells that are electrically connected, or multiple groups of cells that are electrically connected. The connections can be, for example, series, parallel, or a combination thereof.

When selecting the battery 204 and/or designing the battery 204 for a given application or product, a battery designer (e.g., an engineer) may determine whether the battery 204 meets one or more requirements of the battery 204 for the application or product. For example, a manufacturer of the product may require that the battery 204 have at least a predetermined operational life. The predetermined operational life may be referred to as a required operational life (e.g., in years).

The required operational life may be based on an assumed period of use (charging and discharging) of the battery 204 during the required operational life. The assumed period of use of the battery 204 during the required operational life will be referred to as an expected operating period (e.g., in years). The expected operating period is less than or equal to the required operational life. In various implementations, an assumed fraction or percentage may be provided that reflects the fraction or percentage of the required operational life that the battery 204 will be in use. Based on the required operational life and the fraction or percentage, the expected operating period can be determined.

An assumed period that the battery 204 will be at rest during the required operational life can be determined based on the expected operating period and the required operational life. The assumed period that the battery 204 will be at rest during the required operational period will be referred to as an expected resting period (e.g., in years).

The expected resting period is also less than or equal to the required operational life. The expected resting period can be determined as the required operational life minus the expected operating period. In other words, the sum of the expected resting period and the expected operating period is equal to the required operational life. While determining the expected resting period from the required operational life and the expected operating period is described, the expected resting period may be provided, and the expected operating period may be determined from the required operational life and the expected resting period.

An expected life of the battery 204 (e.g., in years) is generated using a battery life expectation module 208. The battery life expectation module 208 may be implemented in a computer, such as a personal computer, a tablet, a phone, or another suitable type of device.

The battery life expectation module 208 generates the expected life of the battery 204 based on user input. More specifically, the battery life expectation module 208 generates the expected life of the battery 204 based on the required operational life for the battery 204 and at least one of the expected operating period of the battery 204 and the expected resting period of the battery 204. A user inputs data for the required operational life for the battery 204 and at least one of the expected operating period of the battery 204 and the expected resting period of the battery 204.

If data for only one of the expected operating period and the expected resting period is input by the user, the battery life expectation module 208 determines the other one of the expected operating period and the expected resting period based on the required operational life and the one of the expected operating period and the expected resting period. For example, when the user only inputs data for the expected operating period, the battery life expectation module 208 sets the expected resting period equal to the required operational life minus the expected operating period. When the user only inputs data for the expected resting period, the battery life expectation module 208 sets the expected operating period equal to the required operational life minus the expected resting period.

The battery life expectation module 208 generates the expected life of the battery 204 further based on a resting life the battery 204, a cycle life of the battery 204, and a cycling period of the battery 204. A user also inputs data for the resting life of the battery 204, the cycle life of the battery 204, and the cycle period of the battery 204.

The resting life of the battery 204 may refer to a period of continuous non-use (i.e., rest) of the battery 204 after which the battery 204 will likely be unable to meet one or more performance criteria. For example only, the resting life of the battery 204 may refer to a period of continuous non-use of the battery 204 after which a duration of discharge of the battery 204 will likely be less than or equal to half of an initial duration of discharge of the battery 204. The resting life of the battery 204 may be expressed in years or another suitable measure of time.

The cycle life of the battery 204 may refer to a number of cycles of the battery 204 after which the battery 204 will likely be unable to meet one or more performance criteria. For example, the cycle life of the battery 204 may refer to the number of cycles of the battery 204 after which a duration of discharge of the battery 204 will likely be less than or equal to half of the initial duration of discharge of the battery 204. The cycle life of the battery 204 may be expressed as a number of cycles. A cycle may refer to, for example, a period associated with the battery 204 transitioning from a fully discharged state to a fully charged state and back to the fully discharged state. As an alternative, a cycle may refer to the period associated with the battery 204 transitioning from the fully charged state to the fully discharged state and back to the fully charged state. The cycle period may refer to the period for performing one cycle and may be expressed in years per cycle, hours per cycle, or another suitable measure of time per cycle.

The battery 204 and multiple other batteries may be manufactured using the same processes and materials. In this manner, each of the batteries (including the battery 204 and the other batteries) has virtually the same characteristics. Various tests may be performed to identify various characteristics of the batteries, such as the resting life, the cycle life, and the cycle period. The resting life of the battery 204 and the cycle life of the battery 204 may be determined experimentally based on the measured resting lives and the measured cycle lives of one or more of the other batteries. The cycle period of the battery 204 may be determined experimentally based on the cycle periods of one or more of the other batteries.

A user inputs data for determining the expected life of the battery 204 using one or more user input devices 212. For example only, the user input devices 212 may include a keyboard, a mouse, a trackball, a joystick, a touchscreen display, and other suitable types of user input devices. The user inputs data for the required operational life for the battery 204, the cycle life of the battery 204, the resting life of the battery 204, the cycle period of the battery 204, and at least one of the expected operating period and the expected resting period of the battery 204. The user may, for example, enter values for the required operational life, the resting life, the cycling life, the cycling period, and at least one of the expected operating period and the expected resting period into respective fields in a graphical user interface (GUI). The user may also select units for one or more of the entered values via the GUI, or the user may be required to enter values having predetermined units.

The battery life expectation module 208 generates the expected life of the battery 204 as a function of the required operational life, the resting life, the operating life, the cycle period, and at least one of the expected operating period and the expected resting period. Once generated, the battery life expectation module 208 outputs the expected life of the battery 204 to the user via one or more user output devices 216. For example, the battery life expectation module 208 may display the expected life of the battery 204 on a display, print the expected life of the battery 204 using a printer, and/or output the expected life of the battery 204 to the user via one or more suitable user output devices 216.

Based on whether the expected life of the battery 204 is greater than or equal to the required operational life for the application or product, the battery designer may determine whether the battery 204 is suitable, re-design the battery 204, or select a different battery. For example, if the expected life of the battery 204 is less than the required operational life, the battery designer may re-design the battery 204 or select a different battery to satisfy the required operational life.

FIGS. 3A-3D are functional block diagrams of the system 200 including example implementations of the battery life expectation module 208. Referring now to FIG. 3A, a required life module 304 generates a required operational life 308 of the battery 204 based on user input data regarding the required operational life of the battery 204. The required life module 304 may set the required operational life 308 equal to a value input by the user for the required operational life 308. In various implementations, the required life module 304 may generate the required operational life 308 by converting a value input by the user for the required operational life 308 into a value having predetermined units (e.g., years).

An expected operating period module 312 generates an expected operating period 316 of the battery 204 based on user input data regarding the expected operating period of the battery 204 during the required operational life. The expected operating period module 312 may set the expected operating period 316 equal to a value input by the user for the expected operating period 316. In various implementations, the expected operating period module 312 may generate the expected operating period 316 by converting a value input by the user for the expected operating period into a value having the predetermined units (e.g., years). Additionally or alternatively, the expected operating period module 312 may generate the expected operating period 316 based on the required operational life 308 and a value input by the user for determining the expected operating period. For example, the user may input a value between 0 and 1, inclusive, and the expected operating period module 312 may generate the expected operating period 316 based on a product of the value and the required operational life 308.

A resting life module 320 generates a resting life 324 of the battery 204 based on user input data regarding the resting life of the battery 204. The resting life module 320 may set the resting life 324 equal to a value input by the user for the resting life. In various implementations, the resting life module 320 may generate the resting life 324 by converting a value input by the user for the resting life into a value having the predetermined units (e.g., years).

A cycle life module 328 generates a cycle life 332 (in number of cycles) of the battery 204 based on user input data regarding the cycle life of the battery 204. The cycle life module 328 may set the cycle life 332 equal to a value input by the user for the cycle life.

A cycle period module 336 generates a cycle period 340 of the battery 204 based on user input data regarding the cycle period of the battery 204. The cycle period module 336 may set the cycle period 340 equal to a value input by the user for the cycle period. In various implementations, the cycle period module 336 may generate the cycle period 340 by converting a value input by the user for the cycle period into a value having the predetermined units (e.g., years per cycle).

A resting age factor module 344 determines a resting age factor 348 (a unitless value) for the battery 204 based on the required operational life 308 of the battery 204 and the resting life 324 of the battery 204. More specifically, the resting age factor module 344 determines the resting age factor 348 as a function of the required operational life 308 and the resting life 324. The resting age factor module 344 may, for example, set the resting age factor 348 using the equation:

$$RAF = \frac{ROL}{RL}, \tag{1}$$

where RAF is the resting age factor 348, ROL is the required operational life 308, and RL is the resting life 324.

An operating age factor module 356 determines an operating age factor 356 (a unitless value) for the battery 204 based on the required operational life 308 of the battery 204, the cycle life 332 of the battery 204, and the cycle period 340 of the battery 204. More specifically, the operating age factor module 352 determines the operating age factor 356 as a function of the required operational life 308, the cycle life 332, and the cycle period 340. The operating age factor module 352 may, for example, set the operating age factor 356 using the equation:

$$OAF = \frac{ROL}{(CL*CP)}, \qquad (2)$$

where OAF is the operating age factor 356, ROL is the required operational life 308, CL is the cycle life 332, and CP is the cycle period 340.

A combined age factor module 360 determines a combined age factor 364 (a unitless value) for the battery 204. As in the example of FIG. 3A, the combined age factor module 360 may determine the combined age factor 364 based on the required operational life 308 of the battery 204, the operating age factor 356, the resting age factor 348, and the expected operating period 316. More specifically, the combined age factor module 360 may determine the combined age factor 364 as a function of the required operational life 308, the operating age factor 356, the resting age factor 348, and the expected operating period 316. The combined age factor module 360 may, for example, set the combined age factor 364 using the equation:

$$CAF = \frac{(ROL - EOP)}{ROL}*RAF + \frac{EOP}{ROL}*OAF, \qquad (3)$$

where CAF is the combined age factor 364, ROL is the required operational life 308, EOP is the expected operating period 316, RAF is the resting age factor 348, and OAF is the operating age factor 356.

Figure 3B:
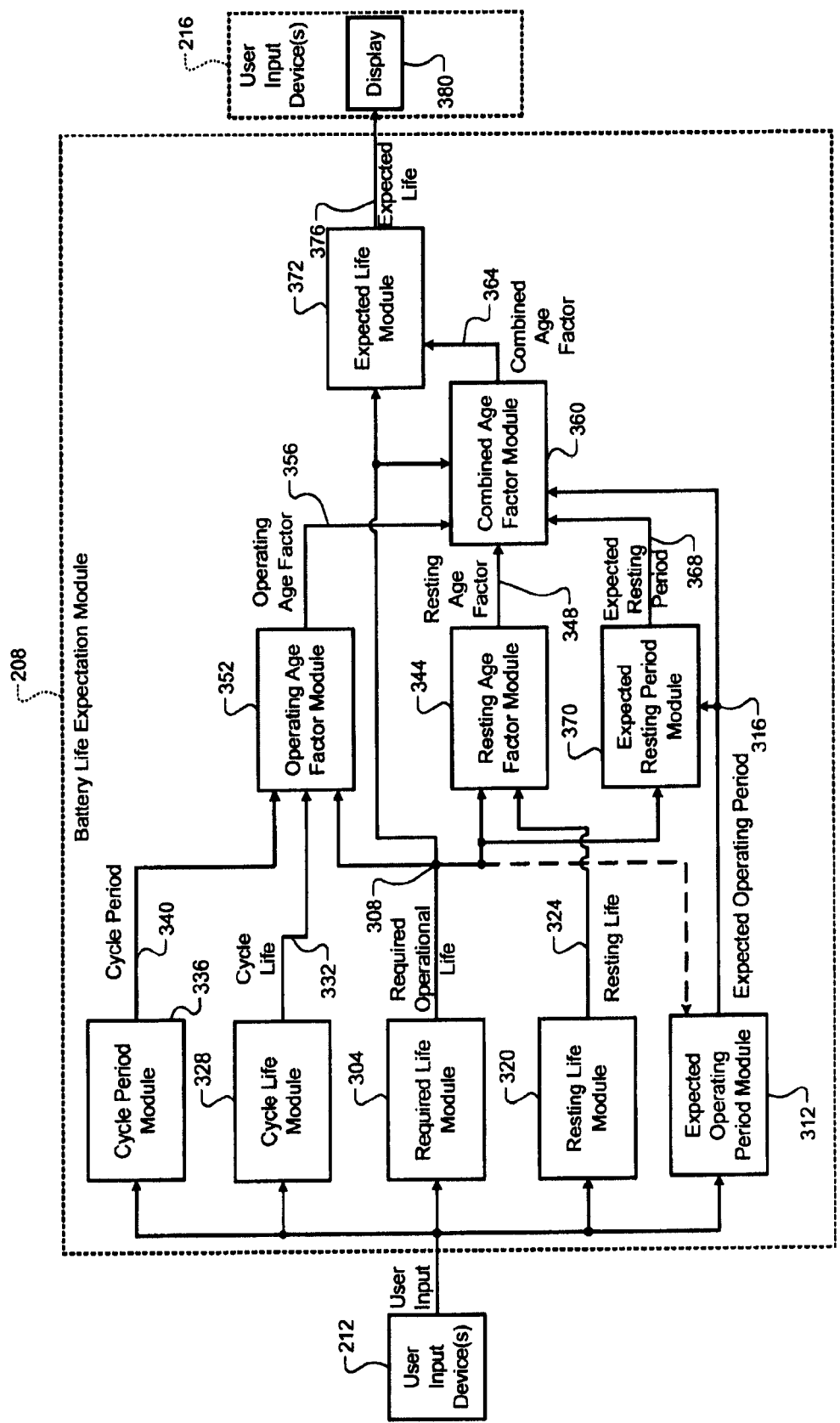

As in the example of FIG. 3B, the combined age factor module 360 may determine the combined age factor 364 based on the required operational life 308, the operating age factor 356, the resting age factor 348, the expected operating period 316, and an expected resting period 368 (e.g., in years) of the battery 204. More specifically, the combined age factor module 360 may determine the combined age factor 364 as a function of the required operational life 308, the operating age factor 356, the resting age factor 348, the expected operating period 316, and the expected resting period 368. The combined age factor module 360 may, for example, set the combined age factor 364 using the equation:

$$CAF = \frac{ERP}{ROL}*RAF + \frac{EOP}{ROL}*OAF, \qquad (4)$$

where CAF is the combined age factor 364, ERP is the expected resting period 368, ROL is the required operational life 308, EOP is the expected operating period 316, RAF is the resting age factor 348, and OAF is the operating age factor 356.

An expected resting period module 370 may generate the expected resting period 368 of the battery 204 based on the required operational life 308 and the expected operating period 316. The expected resting period module 370 may, for example, set the expected resting period 368 using the equation:

$$ERP = ROL - EOP, \qquad (5)$$

where ERP is the expected resting period 368, ROL is the required operational life 308, and EOP is the expected operating period 316.

Figure 3C:
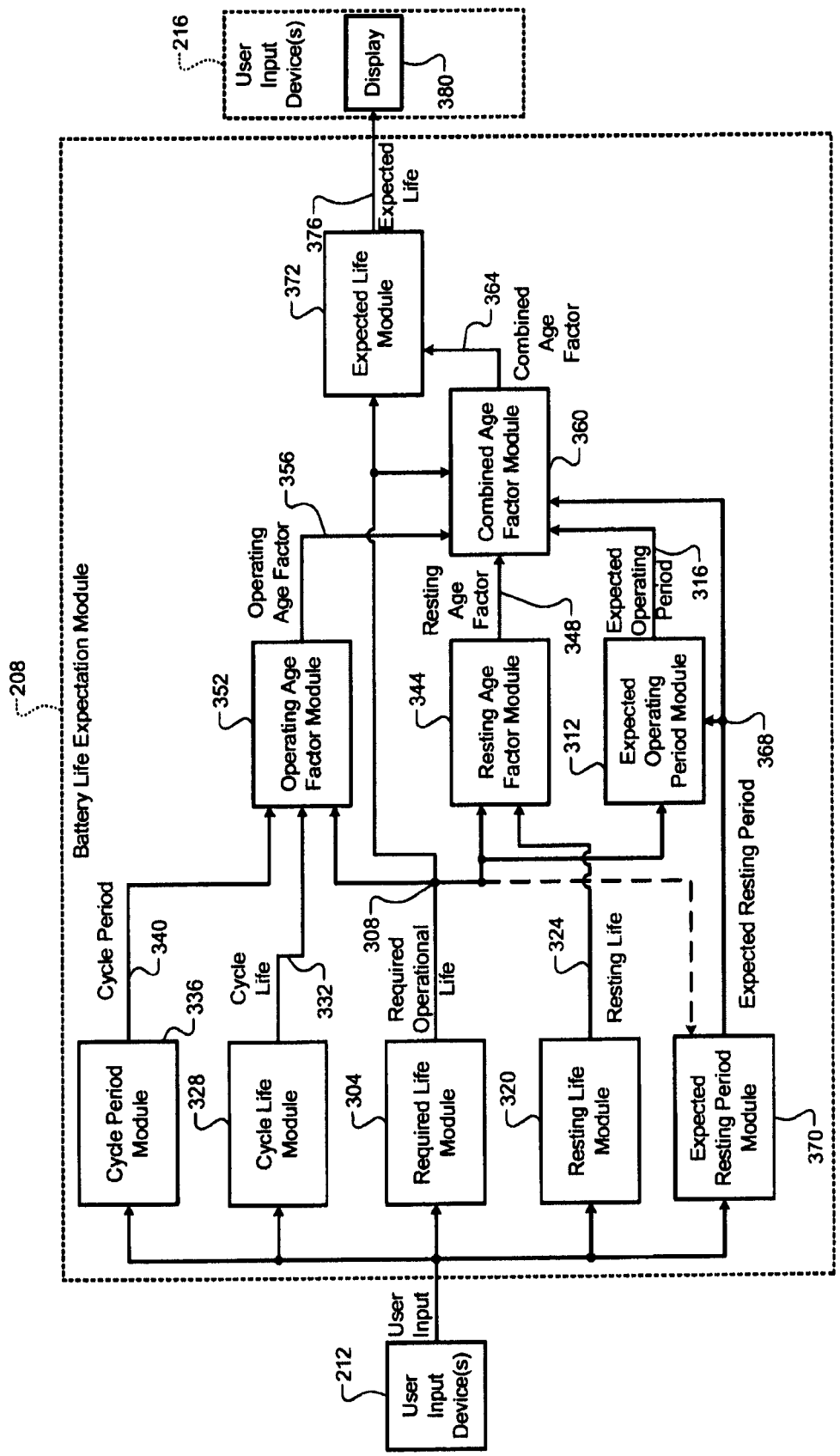

As in the example of FIG. 3C, the expected resting period module 370 may generate the expected resting period 368 of the battery 204 based on user input data regarding the expected resting period of the battery 204 during the required operational life. The expected resting period module 370 may set the expected resting period 368 equal to a value input by the user for the expected resting period 368. In various implementations, the expected resting period module 370 may generate the expected resting period 368 by converting a value input by the user for the expected resting period into a value having the predetermined units (e.g., years). The expected resting period module 370 may additionally or alternatively generate the expected resting period 368 based on the required operational life 308 and a value input by the user for determining the expected resting period 368. For example, the user may input a value between 0 and 1, inclusive, and the expected resting period module 370 may generate the expected resting period 368 based on a product of the value and the required operational life 308.

The expected operating period module 312 may generate the expected operating period 316 of the battery 204 based on the required operational life 308 and the expected resting period 368. The expected operating period module 312 may, for example, set the expected operating period 316 using the equation:

$$EOP = ROL - ERP, \qquad (6)$$

where ERP is the expected resting period 368, ROL is the required operational life 308, and EOP is the expected operating period 316. The combined age factor module 360 may determine the combined age factor 364 as discussed above in conjunction with the example of FIG. 3B.

Figure 3D:
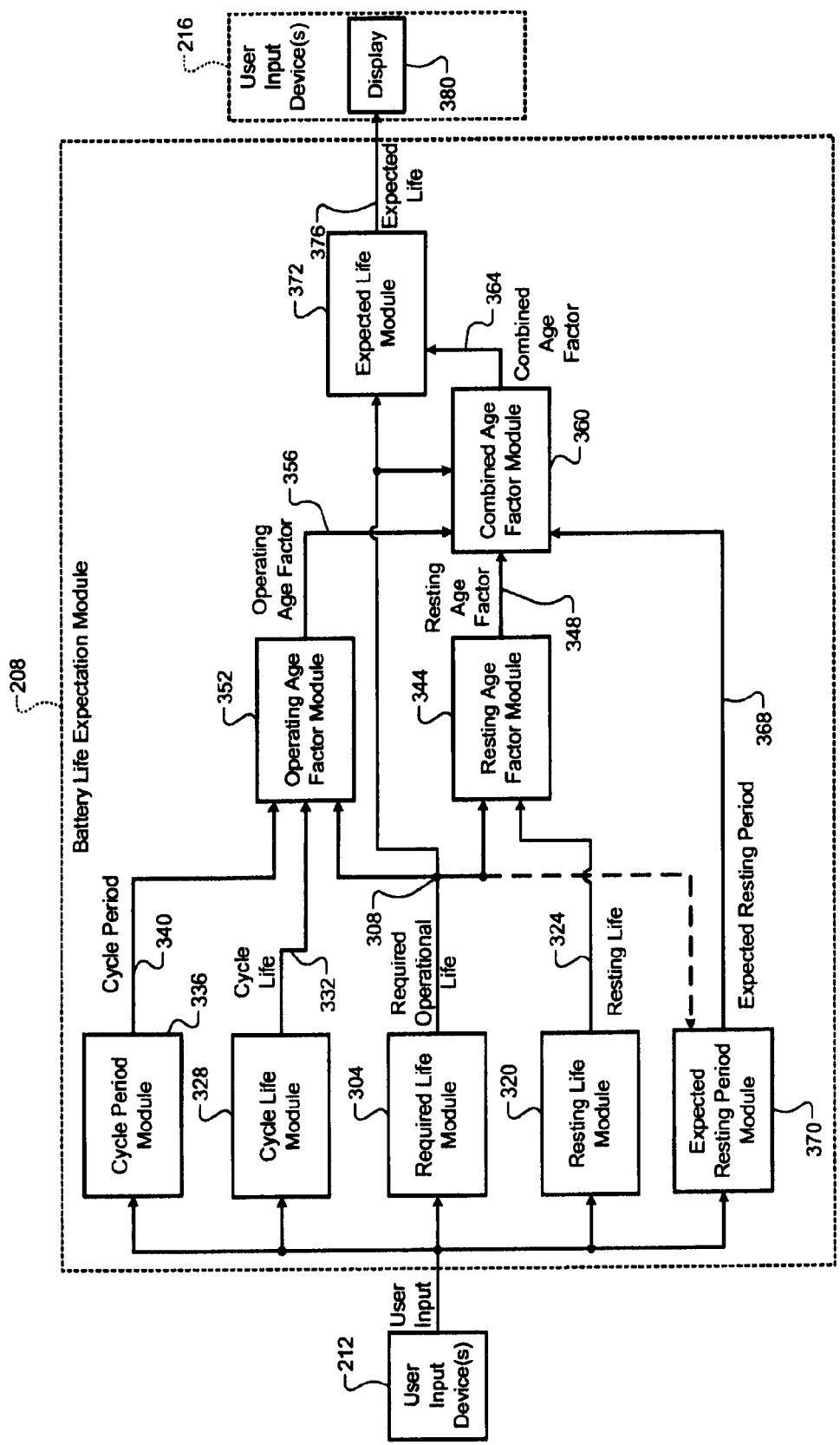

As in the example of FIG. 3D, the combined age factor module 360 may determine the combined age factor 364 based on the required operational life 308 of the battery 204, the operating age factor 356, the resting age factor 348, and the expected resting period 368. More specifically, the combined age factor module 360 may determine the combined age factor 364 as a function of the required operational life 308, the operating age factor 356, the resting age factor 348, and the expected resting period 368. The combined age factor module 360 may, for example, set the combined age factor 364 using the equation:

$$CAF = \frac{ERP}{ROL}*RAF + \frac{(ROL - ERP)}{ROL}*OAF, \qquad (7)$$

where CAF is the combined age factor 364, ROL is the required operational life 308, ERP is the expected resting period 368, RAF is the resting age factor 348, and OAF is the operating age factor 356.

Referring now to FIGS. 3A-3D, an expected life module 372 generates an expected life 376 (e.g., in years) of the battery 204 based on the required operational life 308 and the combined age factor 364. More specifically, the expected life module 372 generates the expected life 376 as a function of the required operational life 308 and the combined age factor 364. The expected life module 372 may, for example, set the expected life 376 using the equation:

$$EL = \frac{ROL}{CAF}, \quad (8)$$

where EL is the expected life 376, ROL is the required operational life 308, and CAF is the combined age factor 364.

The expected life module 372 indicates the expected life 376 to the user via one or more of the user output devices 216, such as a display 380. In this manner, the expected life 376 of the battery 204 is indicated to the user. Based on the expected life 376, the battery 204 can be re-designed, another battery can be chosen, or the battery 204 can be selected for use for the product or application.

Figure 4:
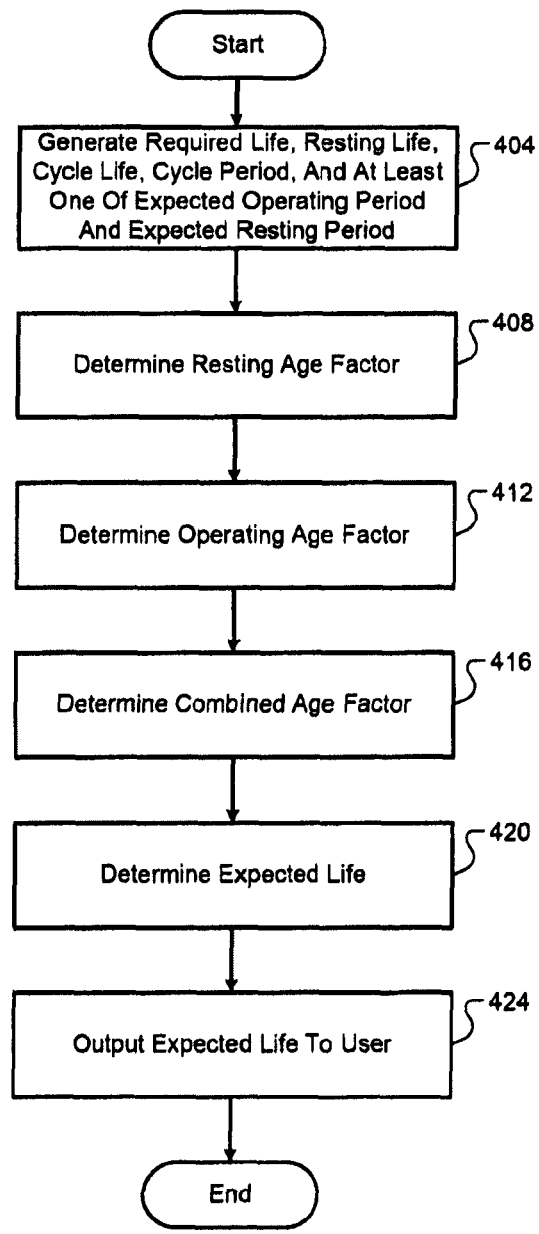
FIG. 4 is a flowchart depicting an example method of determining an expected life of a battery according to the present disclosure.

Referring now to FIG. 4, a flowchart depicting an example method of determining and outputting the expected life 376 to a user is presented. Control may begin with 404 where, based on user input, control generates the required operational life 308 of the battery 204, the resting life 324 of the battery 204, the cycle life 332 of the battery 204, and the cycle period 340 of the battery 204. At 404, based on user input, control also generates at least one of the expected operating period 316 of the battery 204 during the required operational life 308 and the expected resting period 368 of the battery 204 during the required operational life 308. The sum of the expected resting period 368 and the expected operating period 316 is equal to the required operational life 308.

At 408, control determines the resting age factor 348 for the battery 204. Control determines the resting age factor 348 based on the required operational life 308 of the battery 204 and the resting life 324 of the battery 204. More specifically, control determines the resting age factor 348 as a function of the required operational life 308 and the resting life 324. Control may determine the resting age factor 348 using equation (1) above.

Control determines the operating age factor 356 of the battery 204 at 412. Control determines the operating age factor 356 based on the required operational life 308 of the battery 204, the cycle life 332 of the battery 204, and the cycle period 340 of the battery 204. More specifically, control determines the operating age factor 356 as a function of the required operational life 308, the cycle life 332, and the cycle period 340. Control may determine the operating age factor 356 using equation (2) above.

At 416, control determines the combined age factor 364 of the battery 204. Control determines the combined age factor 364 based on the required operational life 308, the resting age factor 348, the operating age factor 356, and at least one of the expected operating period 316 and the expected resting period 368. More specifically, control determines the combined age factor 364 as a function of the required operational life 308, the resting age factor 348, the operating age factor 356, and at least one of the expected operating period 316 and the expected resting period 368. Control may determine the combined age factor 364, for example, using equation (3), equation (4), or equation (7), above.

At 420, control determines the expected life 376 of the battery 204. Control determines the expected life 376 of the battery 204 based on the required operational life 308 and the combined age factor 364. More specifically, control determines the expected life 376 as a function of the required operational life 308 and the combined age factor 364. Control may, for example, determine the expected life 376 using equation (8) above. At 424, control outputs the expected life 376 of the battery 204 using one or more of the user output devices, such as the display 380, a printer, or another suitable output device.

An example will now be provided. For example only, the values input by a user may be as follows.

(1) Required Operational Life=5 years (43,800 hours, assuming 365 days and 8760 hours per year).
(2) Resting Life=10 years.
(3) Cycle life=1,000 cycles.
(4) Cycle Period=8.76 hours/cycle.
(5) Expected Operating Period During Operational Life=4380 hours=0.5 years.

From the required operational life and the expected operating period, it can be determined that the expected resting period is 4.5 years (i.e., 5 years−0.5 years=4.5 years). From the required operational life and the resting life, it can be determined that the resting age factor is 0.5 (i.e., 5 years/10 years=0.5). From the required operational life, the cycle life, and the cycle period, it can be determined that the operating age factor is 5 (i.e., 5 years/(1000 cycles*8.76 hours/cycle)=5 after conversion of hours to years or vice versa). From the required operational life, the expected operating period, the expected resting period, the resting age factor, and the operating age factor, it can be determined that the combined age factor is 0.95 (i.e., (0.5 years/5 years)*5+(4.5 years/5 years)*0.5=0.95). From the required operational life and the combined age factor, it can be determined that the expected life is 5.26 years (i.e., 5 years/0.95=5.26 years).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for determining an expected life of a battery, the system comprising:
   (a) a first age factor module that generates a first age factor value for the battery based on:
      (i) a cycle period of the battery generated based on user input;
      (ii) a required operational life of the battery generated based on user input, the required operational life corresponding to a continuous period including both cycling and resting of the battery during which the battery is required to satisfy one or more predetermined performance criteria; and
      (iii) a cycle life of the battery generated based on user input, the cycle life corresponding to a period of continuous cycling of the battery after which the battery is expected to begin to fail to satisfy at least one of the predetermined performance criteria;
   (b) a second age factor module that generates a second age factor value for the battery based on:
      (i) the required operational life of the battery; and
      (ii) a resting life of the battery generated based on user input, the resting life of the battery corresponding to a period of continuous resting of the battery after which the battery is expected to begin to fail to satisfy at least one of the predetermined performance criteria;
   (c) a third age factor module that generates a third age factor value for the battery based on:
      (i) the required operational life of the battery;
      (ii) the first age factor value;
      (iii) the second age factor value; and
      (iv) at least one of an expected period of cycling of the battery during the required operational life and expected period of resting of the battery during the required operational life; and
   (d) an expected life module that generates an expected life of the battery based on the required operational life of the battery and the third age factor value and that displays the expected life of the battery on a display.

2. The system of claim 1 wherein the expected life module sets the expected life of the battery equal to the required operational life of the battery divided by the third age factor value.

3. The system of claim 1 wherein the expected period of cycling of the battery is generated based on user input and the expected period of resting of the battery is generated based on user input.

4. The system of claim 1 wherein the third age factor module sets the third age factor value equal to a first period plus a second period, sets the first period equal to the expected period of resting of the battery during the required operational life multiplied by the second age factor value, and sets the second period equal to the expected period of cycling of the battery during the required operational life multiplied by the first age factor value.

5. The system of claim 4 further comprising:
   an expected operating period module that generates the expected period of cycling of the battery based on user input; and
   an expected resting period module that sets the expected period of resting of the battery equal to the required operational life minus the expected period of cycling of the battery.

6. The system of claim 4 further comprising:
   an expected resting period module that generates the expected period of resting of the battery based on user input; and
   an expected operating period module that sets the expected period of cycling of the battery equal to the required operational life minus the expected period of resting of the battery.

7. The system of claim 1 wherein the third age factor module sets the third age factor value equal to a first period plus a second period, sets the first period equal to the first age factor value multiplied by the expected period of cycling of the battery during the required operational life, sets the second period equal to the second age factor value multiplied by a third period, and sets the third period equal to the required operational life of the battery minus the expected period of cycling of the battery during the required operational life.

8. The system of claim 1 wherein the third age factor module sets the third age factor value equal to a first period plus a second period, sets the first period equal to the first age factor value multiplied by a third period, sets the third period equal to the required operational life of the battery minus the expected period of resting of the battery during the required operational life, and sets the second period equal to the second age factor value multiplied by the expected period of resting of the battery during the required operational life.

9. The system of claim 1 wherein the first age factor module sets the first age factor value for the battery equal to the required operational life divided by a period that is equal to a product of the cycle period and the cycle life.

10. The system of claim 1 wherein the second age factor module sets the second age factor value equal to the required operational life divided by the resting life.

11. A method for determining an expected life of a battery, the method comprising:
    (a) generating, with a first age factor module, a first age factor value for the battery based on:
       (i) a cycle period of the battery generated based on user input;
       (ii) a required operational life of the battery generated based on user input, the required operational life corresponding to a continuous period including both cycling and resting of the battery during which the battery is required to satisfy one or more predetermined performance criteria; and
       (iii) a cycle life of the battery generated based on user input, the cycle life corresponding to a period of continuous cycling of the battery after which the battery is expected to begin to fail to satisfy at least one of the predetermined performance criteria;
    (b) generating, with a second age factor module, a second age factor value for the battery based on:
       (i) the required operational life of the battery; and
       (ii) a resting life of the battery generated based on user input, the resting life of the battery corresponding to a period of continuous resting of the battery after which the battery is expected to begin to fail to satisfy at least one of the predetermined performance criteria;

(c) generating, with a third age factor module, a third age factor value for the battery based on:
   (i) the required operational life of the battery;
   (ii) the first age factor value;
   (iii) the second age factor value; and
   (iv) at least one of an expected period of cycling of the battery during the required operational life and expected period of resting of the battery during the required operational life;

(d) generating, with an expected life module, an expected life of the battery based on the required operational life of the battery and the third age factor value; and (e) displaying, with the expected life module, the expected life of the battery on a display.

12. The method of claim 11 further comprising setting, with the expected life module, the expected life of the battery equal to the required operational life of the battery divided by the third age factor value.

13. The method of claim 11 further comprising:
generating, with the third age factor module, the expected period of cycling of the battery based on user input; and
generating, with the third age factor module, the expected period of resting of the battery based on user input.

14. The method of claim 11 further comprising:
setting, with the third age factor module, the third age factor value equal to a first period plus a second period;
setting, with the third age factor module, the first period equal to the expected period of resting of the battery during the required operational life multiplied by the second age factor value; and
setting, with the third age factor module, the second period equal to the expected period of cycling of the battery during the required operational life multiplied by the first age factor value.

15. The method of claim 14 further comprising:
generating, with an expected operating period module, the expected period of cycling of the battery based on user input; and
setting, with an expected resting period module, the expected period of resting of the battery equal to the required operational life minus the expected period of cycling of the battery.

16. The method of claim 14 further comprising:
generating, with an expected resting period module, the expected period of resting of the battery based on user input; and
setting, with an expected operating period module, the expected period of cycling of the battery equal to the required operational life minus the expected period of resting of the battery.

17. The method of claim 11 further comprising:
setting, with the third age factor module, the third age factor value equal to a first period plus a second period;
setting, with the third age factor module, the first period equal to the first age factor value multiplied by the expected period of cycling of the battery during the required operational life;
setting, with the third age factor module, the second period equal to the second age factor value multiplied by a third period; and
setting, with the third age factor module, the third period equal to the required operational life of the battery minus the expected period of cycling of the battery during the required operational life.

18. The method of claim 11 further comprising:
setting, with the third age factor module, the third age factor value equal to a first period plus a second period;
setting, with the third age factor module, the first period equal to the first age factor value multiplied by a third period;
setting, with the third age factor module, the third period equal to the required operational life of the battery minus the expected period of resting of the battery during the required operational life; and
setting, with the third age factor module, the second period equal to the second age factor value multiplied by the expected period of resting of the battery during the required operational life.

19. The method of claim 11 further comprising setting, with the first age factor module, the first age factor value for the battery equal to the required operational life divided by a period that is equal to a product of the cycle period and the cycle life.

20. The method of claim 11 further comprising setting, with the second age factor module, the second age factor value equal to the required operational life divided by the resting life.

\* \* \* \* \*